Jan. 1, 1952     A. CARLSON     2,581,170
REFRIGERATED BOTTLE VENDING APPARATUS
Filed Sept. 12, 1946     7 Sheets-Sheet 2
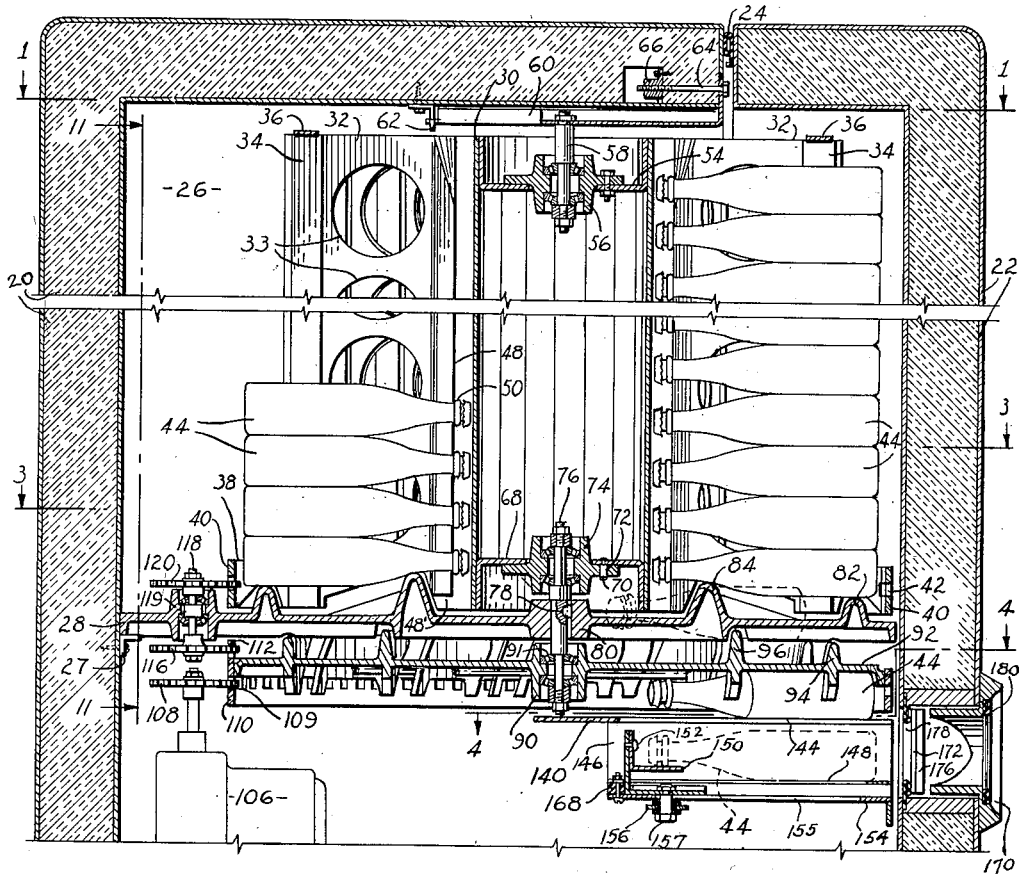
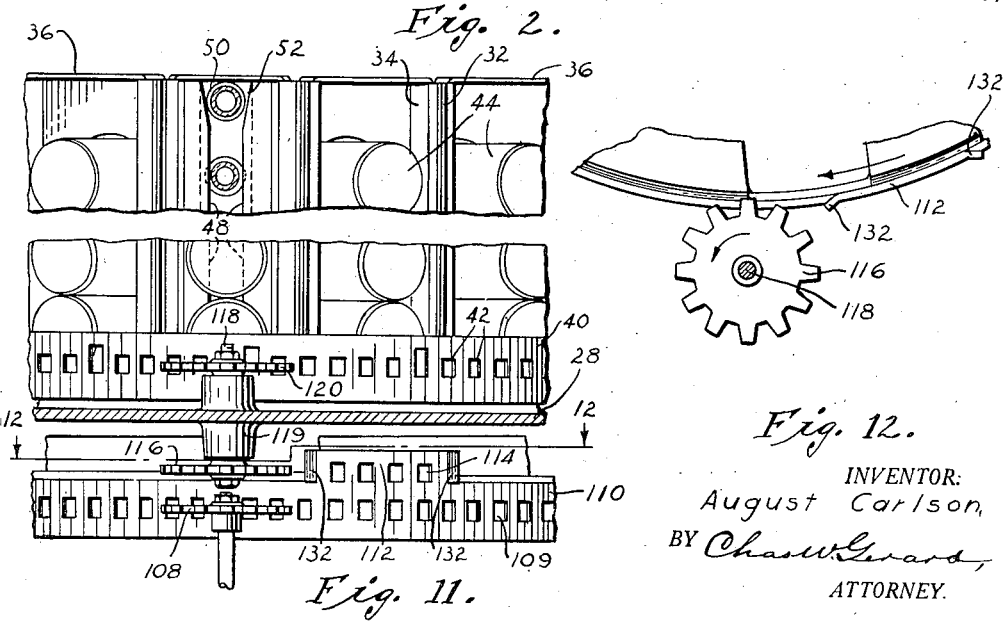
INVENTOR:
August Carlson,
BY Chas. W. Gerard,
ATTORNEY.

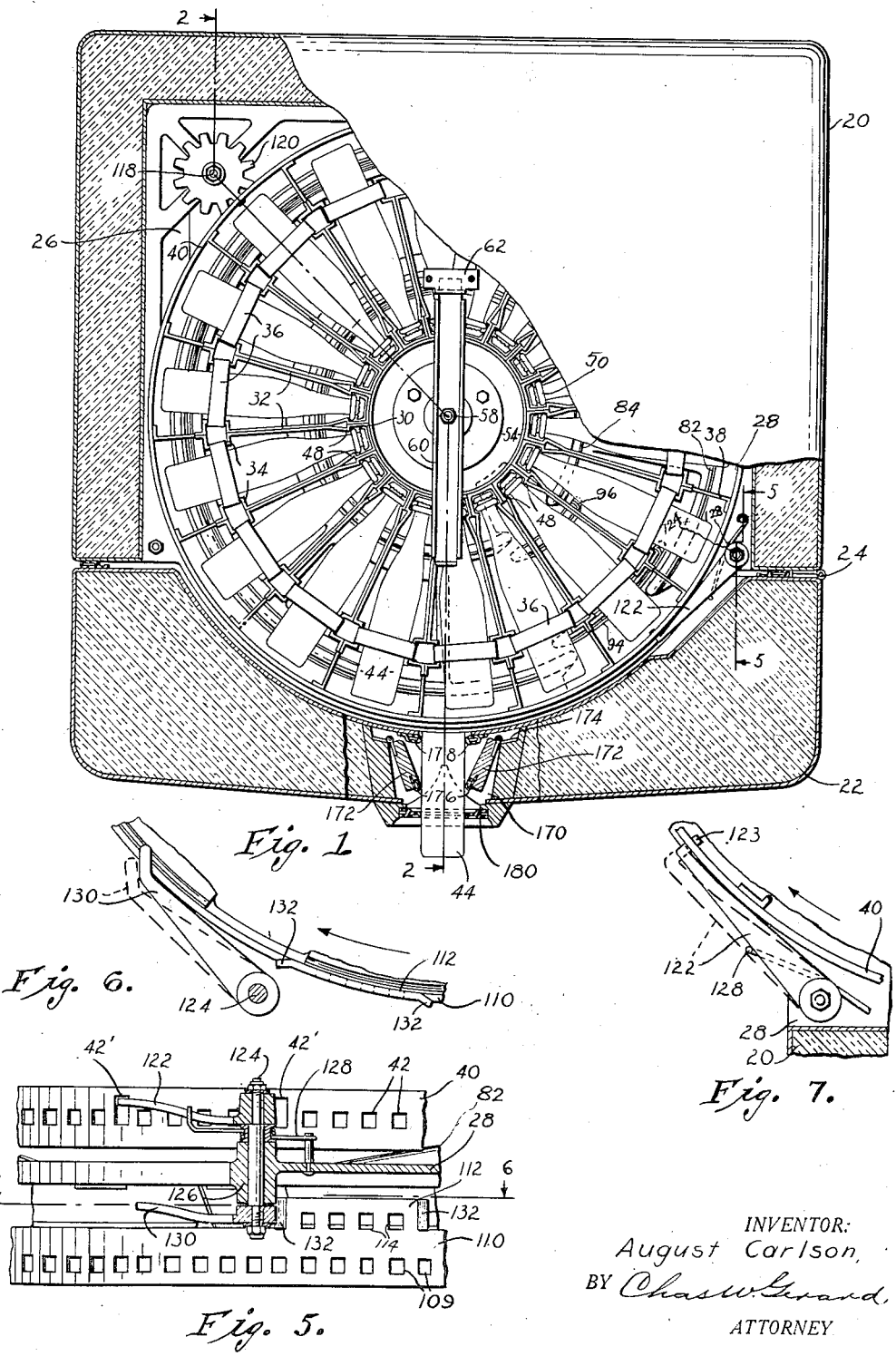

Jan. 1, 1952     A. CARLSON     2,581,170
REFRIGERATED BOTTLE VENDING APPARATUS
Filed Sept. 12, 1946     7 Sheets-Sheet 3

INVENTOR:
August Carlson,
BY
ATTORNEY.

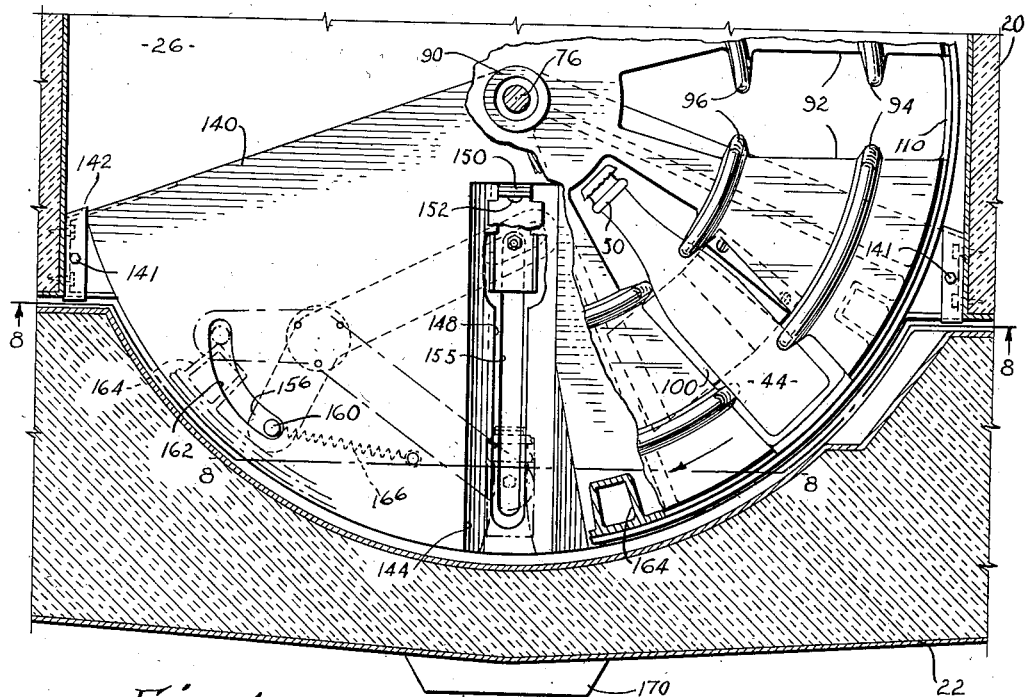

INVENTOR:
August Carlson,
BY Chas W. Gerard.
ATTORNEY.

INVENTOR:
August Carlson,
BY Chas. W. Gerard.
ATTORNEY.

Jan. 1, 1952  A. CARLSON  2,581,170
REFRIGERATED BOTTLE VENDING APPARATUS
Filed Sept. 12, 1946  7 Sheets-Sheet 7

INVENTOR:
August Carlson,
BY Chase&Gerard,
ATTORNEY.

Patented Jan. 1, 1952

2,581,170

UNITED STATES PATENT OFFICE 2,581,170

REFRIGERATED BOTTLE VENDING APPARATUS

August Carlson, Kansas City, Mo.

Application September 12, 1946, Serial No. 696,537

15 Claims. (Cl. 312—46)

The present invention relates to vending apparatus, with particular relation to coin-controlled vending machines for the dispensing of refrigerated bottled goods containing soda beverages and the like.

Accordingly, one principal object of the invention is to provide an improved apparatus in which the bottles containing the beverage to be handled are stored in a plurality of stacks adapted to be subjected to a refrigerating action and also provided with means for feeding and discharging a predetermined number of bottles from the same stack following which the magazine structure containing said stacks is automatically shifted for locating a new stack in position for the bottle dispensing operation, to the end that the load carried by the magazine structure may be maintained more or less evenly balanced by carrying out the dispensing operation progressively around the axis of said magazine structure.

A further object of the invention is to devise an improved construction in which means is provided for maintaining the bottles in efficiently supported horizontal position throughout their movement from the bottle compartments of the magazine to the dispensing mechanism and while being transferred to bottle ejecting position, and by an efficient and smoothly operating action which prevents any reverse movement of the bottles, and all tending to produce a substantially vibrationless and extremely quiet vending operation.

Another important object of the invention is to devise an improved apparatus in which means is provided for ejecting the bottles into convenient position for enabling the customer to readily grasp the same at the exterior of the machine, and at the same time preventing any material break in the air seal protecting the discharge passage through which the bottle is ejected into vended position.

A still further object of the invention is to provide an improved construction of the character described in which the apparatus is comprised of separate units or assemblies, such as the magazine or bottle supply unit, the bottle feeding or dispensing unit, and the bottle ejecting unit, which units or assemblies may be separately installed or removed from the cabinet member, for independent servicing or renewal, as required.

It is also sought to provide a greatly simplified construction of comparatively few parts of improved and efficient design and adapted to give troublefree operation and service, but of a character easy to repair or replace if necessary.

It is a further object to improve generally vending apparatus of the above-indicated type, both in the interests of economy of construction and operation as well as in the neatness and attractiveness of the appearance of the machine.

With the foregoing general objects in view the invention will now be described by reference to the accompanying drawings illustrating one form of construction which has been found desirable for the embodiment of the proposed improvements, after which those features and combinations deemed to be novel and patentable will be particularly set forth and claimed.

In the drawings:

Figure 1 is a sectional plan view showing a bottle vending apparatus constructed in accordance with the present invention and representing a horizontal section taken on the line 1—1 of Figure 2;

Figure 2 is a vertical sectional view, representing a section taken on the line 2—2 of Figure 1;

Figure 4 is a horizontal sectional view showing the bottle ejecting mechanism and representing a section taken on the line 4—4 of Figure 2;

Figure 5 is a sectional detail of the magazine latching device and representing a section taken on the line 5—5 of Figure 1;

Figure 6 is a sectional detail of the same, being a section indicated by the section line 6—6 of Figure 5;

Figure 7 is a similar sectional detail of a part of said latch device;

Figure 8 is a vertical sectional view, representing a section taken on the line 8—8 of Figure 4;

Figures 13, 14:
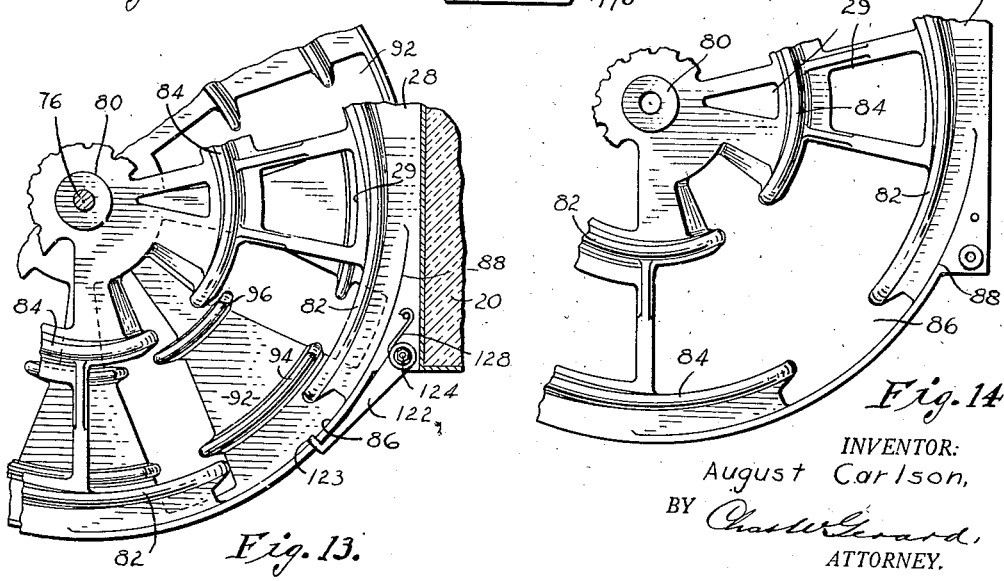
Figure 19:
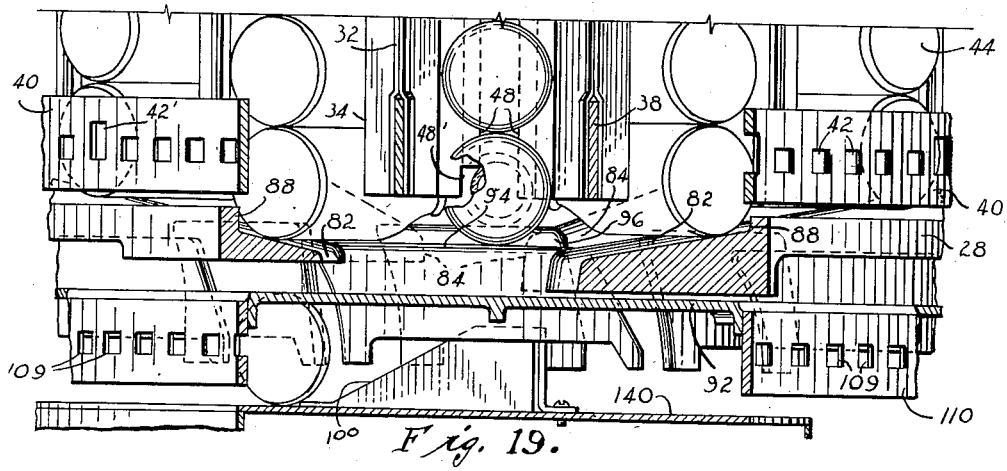
Figure 20:
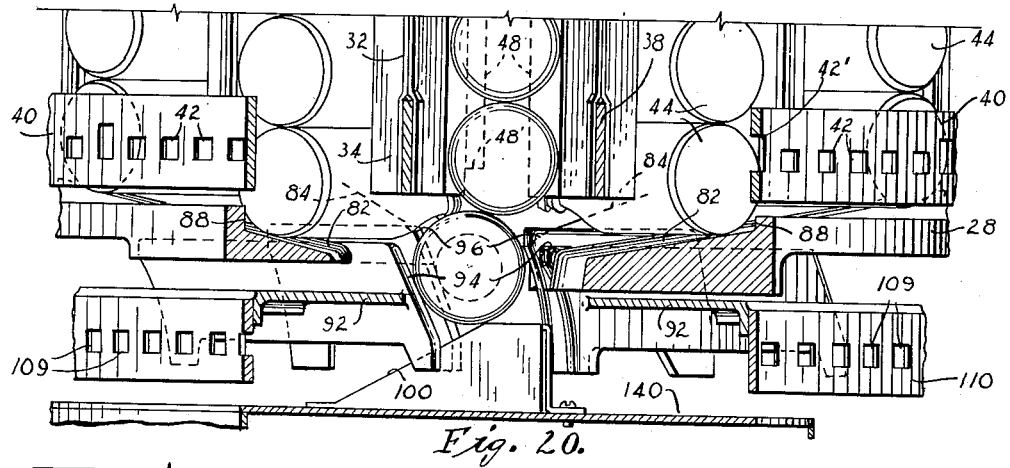
Figure 21:
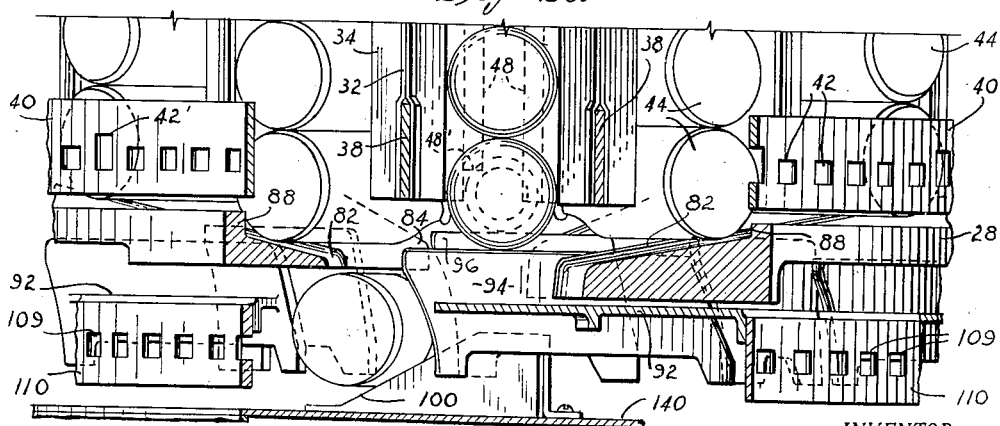

Figures 9 and 10 are detail sectional views, representing sections following the lines 9—9 and 10—10 respectively, of Figure 8;

Figure 11 is a vertical sectional view on an enlarged scale and representing a section taken on the line 11—11 of Figure 2 but with portions broken away;

Figure 12 is a detail section on a still larger scale, representing a section taken on the line 12—12 of Figure 11;

Figure 12 is a fragmentary plan view showing a portion of the bottom of the magazine structure and of the bottle feeding or dispensing member;

Figure 14 is a similar view of that portion of the bottom of the magazine structure containing the bottle outlet opening;

Figure 15 to 18 are fragmentary perspective views showing a portion of the bottom of the bottle magazine structure and of the bottle feeding or dispensing means in different stages of the dispensing operation as hereinafter explained; and Figures 19 to 21 are fragmentary sectional elevations also illustrating said different stages of the bottle dispensing operation.

The present invention relates to improvements in the same type of apparatus as that illustrated in Patent No. 2,424,303, dated July 22, 1947, and Patent No. 2,429,745, dated October 28, 1947.

Referring now to the accompanying drawings in detail, the present form of apparatus is illustrated as comprising a cabinet structure having the main body portion 20 and a door 22 attached by hinges 24 at one side of the body. Both the body and door members are of appropriate insulated construction and the interior face of the door is of concave design, as shown, whereby the bottle magazine unit and the dispensing mechanism may be installed in projecting relation to the body compartment 26 and partly accommodated within said concave portion of the door, as illustrated in Figures 1 and 2 of the drawings.

The magazine structure and the dispensing mechanism are made up in separate sections or assemblies which may be disconnected and separately taken out or replaced within the cabinet compartment 26. Thus the upright portion of the magazine structure and its upper bearings are formed as one unit or assembly adapted to be anchored in assembled relation to a lower bearing forming part of another assembly or unit which includes a removable retainer or supporting plate 28 providing a bottom for the magazine or bottle compartments and also supporting the bottle feeding or dispensing means as well as the magazine rotating or shifting means hereinafter described. Thus supporting plate member 28 is removably mounted on brackets 27 and is of skeleton design to provide air-circulating openings 29 (see Figure 14).

Below this retainer or supporting plate 28 is also removably mounted a unit which is constructed and arranged for receiving the bottles and ejecting or discharging the same through a delivery passage provided in the door 22 at the same height as said ejecting unit.

The magazine structure comprises a central cylindrical structure 30 formed by the inner margins of a plurality of radially arranged panels 32 forming partition structures separating the interior space of the cabinet into a corresponding number of vertical bottle compartments. The several partition units are formed with openings 33 designed for promoting air circulation, and also with square or boxlike outer margins 34 which are connected at the top by tie pieces or strips 36, and are also provided with radial extensions 38 at the bottom for connection with a ring member 40 formed with a series of openings 42 and designed to serve as a rack gear member, as hereinafter explained.

Figure 15:
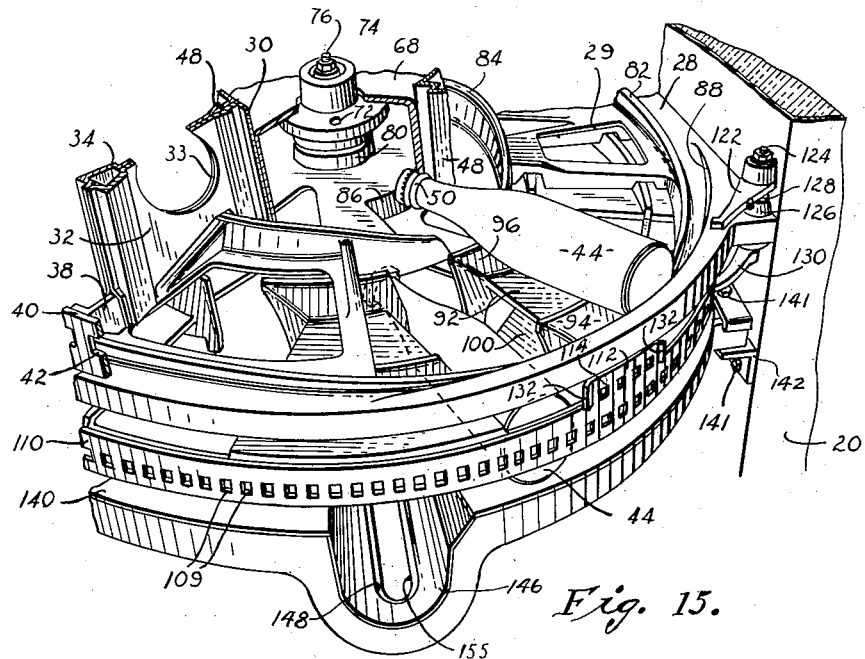

The magazine construction is such as to form radial bottle compartments of inwardly converging shape, corresponding approximately to the shape of the bottles 44, that is, the outer boxing portions are spaced apart approximately the diameter of said bottles. Moreover, the inner margins of the partition units are formed with shoulders 48 adapted for retaining engagement with the ribs 50 on the necks of said bottles 44, as illustrated in Figures 1 and 15 of the drawings.

In this connection it is pointed out that the upper ends of the shoulders 48 are inclined (as illustrated in Figure 11) to provide a flaring entrance opening 52 for the neck ends of the bottles, as required for facilitating insertion of the bottles into stacked relation in the several bottle compartments, in loading or replenishing the supply of bottles in the machine.

Inside the upper end of the cylindrical structure 30 is secured a transverse plate 54 for the support of a conventional type of bearing structure 56 for an axle or spindle element 58 having its upper end secured to an anchoring bar or strip 60, as illustrated in Figures 1 and 2. One end of said bar or strip 60 is adapted for detachable engagement with a fixed bracket 62 attached to the ceiling of the cabinet space 26, and the other end of said strip is turned upward for receiving a screw 64 designed for anchoring engagement with an embedded nut or socket 66 at the upper front margin of said cabinet space 26.

The lower end of the cylindrical structure 30 is also provided with a fixed interior plate 68 having a set of pins or studs 70 for detachable engagement with a set of openings 72 formed in a second roller bearing unit 74 mounted on a spindle 76 which is keyed (as indicated at 78) to the central hub portion 80 at the center of the aforesaid retainer plate 28—see Figure 2.

The upper face of the retainer plate member 28 is formed with spaced annular ribs 82 and 84 of different height, for supporting engagement with the body and neck portions respectively of the bottles 44 and maintaining the latter in substantially horizontal position as illustrated. The plate 28 is also provided with a bottle outlet or discharge opening 86 (see Figure 14) through which the bottles are fed or discharged to the bottle dispensing mechanism, the ends of said ribs 82 and 84 sloping gradually to one side of said opening 86—as shown in Figures 15 to 18.

Moreover, the outer margin or said retainer plate member is formed with a curved shoulder 88 for engagement with the outer ends of the bottles 44, in the vicinity of said discharge opening 86, or throughout that section where the bottle feeding and dispensing operation takes place.

Figure 3:
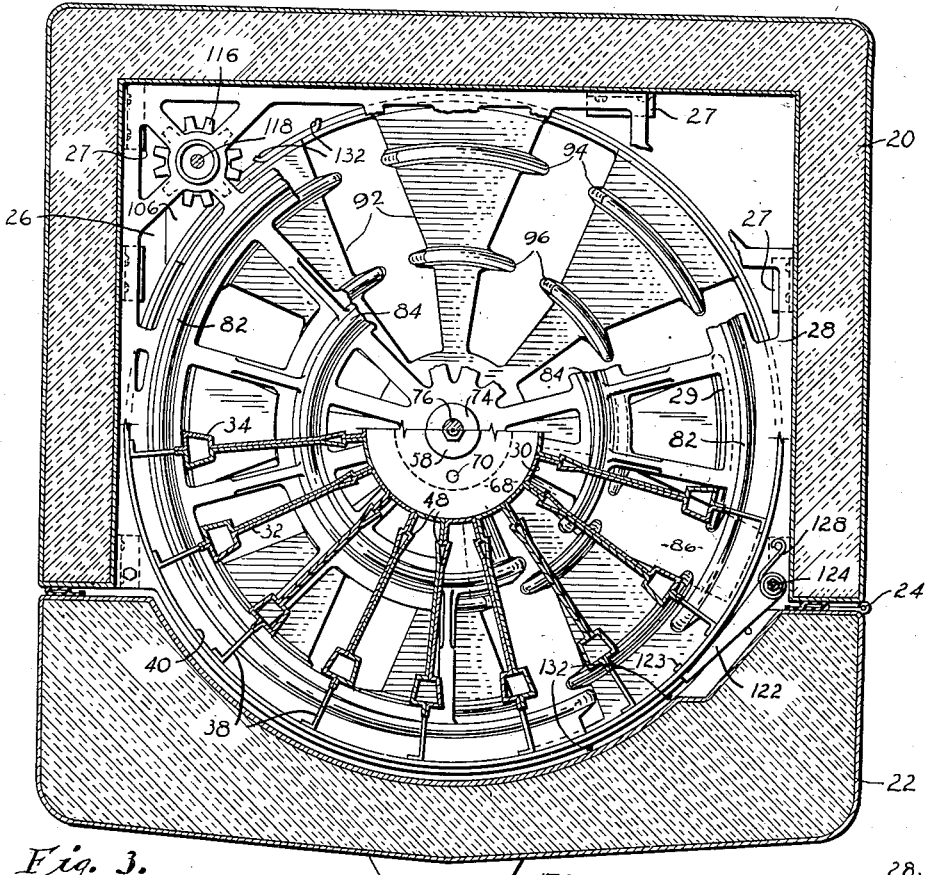
Figure 3 is a horizontal sectional view representing a section taken on the line 3—3 of Figure 2.

For temporarily supporting and conveying, or imparting the necessary feeding movement to the bottles on being discharged through the opening 86, a rotary bottle dispensing device is mounted on the lower end of the spindle 76 and comprises a hub portion 90 housing a conventional type of roller bearing assembly 91 (see Figure 2) in engagement with the spindle, and this hub portion 90 carries a set of radially projecting plate segments 92 in spaced relation for passage of the bottles between them (see Figures 3 and 13). The upper faces of these segments 92 are also formed with radially spaced rib segments 94 and 96 of different height for supporting engagement with the body and neck portions, respectively, of the bottles 44, as in the case of the ribs 82 and 84 of the plate 28, for maintaining the horizontal position of said bottles.

When the space between any two adjoining segments 92 arrives in position directly below the opening 86 of the plate 28, the bottom bottle in the stack directly above said opening lowers through said space on to an inclined platform or ramp element 100 which is supported by the bottle ejecting mechanism above referred to. In this connection it may be pointed out that the ribs 94 and 96 project both above and below the segment plates 92, and are moreover formed with end contours (on the opposite sides of the space between the segment plates) of such design (as represented in Figures 15 et seq.) as to counteract and prevent any casual reverse movement of the bottle, but on the other hand cooperating to maintain a continuous movement thereof in the direction of the bottle ejecting means.

It will also be noted that the distance between the rib projections of each segment plate 92 is such that their lower portions which project below the plate will clear the sides of the platform or ramp element 100 (see Figures 3 and 4).

For rotating the aforesaid structure comprising the bottle feeding or dispensing mechanism, a combination motor and gear reducing unit 106 is provided inside the cabinet and fitted with a gear 108 which meshes with openings 109 in an annular or ring form of rack 110 attached to and connecting the outer margins of the plate segments 92.

At diametrically opposite points (compare Figures 2 and 15), said annular rack member 110 is formed with upwardly projecting rack segments 112, the openings 114 of which are designed to be engaged by a gear 116 fixed to the lower end of a shaft or spindle 118 journaled by a bearing structure 119 mounted in the plate member 28 at a point opposite the bottle discharge opening 86—see Figure 3. To the upper end of said shaft or spindle 118 is attached a similar gear 120 for meshing with the openings 42 of the upper ring member 40 which operates as a rack for intermittently rotating the magazine structure, as hereinafter more fully explained.

Means is also provided for intermittently latching the magazine structure during each period when the bottle dispensing operations are taking place, this means comprising a latch arm 122 attached to a spindle 124 journaled in a bearing 126 formed at one of the front corners of the plate member 28. This arm is yieldingly actuated by a spring 128 (see Figure 7) for normally latching the tooth 123 on the free end of the arm 122 with one of a series of elongated openings 42' of the ring 40. The lower end of the spindle 124 is also secured to a latch-actuating arm 130, the free end of which is intermittently engaged and operated by riding over the upwardly projecting segments 112, thereby disengaging the latch arm 122, for releasing the ring member 40, as illustrated in Figures 5 to 7, Figures 6 and 7 illustrating by dotted lines the retracted positions of the arms 130 and 122, respectively. This unlatching operation is necessary for permitting the gear 116, at the time it is meshed with the gear 112, to transmit the drive action necessary to the upper gear 120 for imparting intermittent rotative movement to the ring gear 40. In this connection it may be stated that the latch engaging and disengaging means is arranged to release the ring gear member 40 slightly in advance of the engagement of the opposite gear segment with the gear 120, and the arrangement of openings 42 and 42' is designed to prevent any latching engagement of the latch arm 122 with the ring gear during the operation of said gear 120.

It is also pointed out that the opposite ends of each segment 112 are provided with angularly projecting lugs or teeth 132 designed for engagement with the teeth of the gear 116 in such a manner as to maintain a meshed or driving relation of said gear and segment for completing a full operative interval of said elements corresponding to each complete operation thereof for shifting the ring gear and the magazine structure.

The bottle ejecting and delivery mechanism comprises a unit or assembly carried by a plate 140 attached by bolts 141 or the like to brackets 142 at opposite sides of the front of the cabinet space, similar fastenings 141 also serving to secure said brackets to the cabinet (see Figs. 4 and 8). This plate 140 is provided with an oblong opening 144 through which the bottle is discharged as it rolls off the inclined platform or ramp element 100 and on into a bottle pocket or chute structure comprising curved side plates 146 attached to the bottom face of the plate 140 at opposite sides of said opening 144, and leaving a slot 148 for movement of the operating connections of the ejector mechanism, see Figure 10.

The mechanism comprises a frame structure 150 of such contour or design as to carry yielding buffer elements 152 in position for abutting engagement with both the neck and also the adjacent cap end of the bottle. The base of the frame 150 operates slidingly through the slot 148 and also within an outer guideway formed by exterior guard strips 154 providing a slideway 155 for a pivotal connection 157 between said frame base and one end of an operating lever 156 which is fulcrumed to the lower end of a pivot stud 158 attached (as indicated at 159 in Figure 9) to the under face of the plate 140. The other end of the lever 156 carries a pin 160 projecting up through a slot 162 in said plate 140 and into the path of movement of a series of lug projections 164 depending from the under faces of the rotating bottle feeding segments 92—see Figure 4.

A coil spring 166 attached to said pin 160 and also to a fixed point on the plate 140, operates to hold the lever 156 in position for maintaining the ejector structure 150 normally in the retracted position shown in Figures 2 and 10.

A suitable buffer element 168 is mounted at the inner end of the discharge chute for taking up the rebound of the ejecting mechanism by engagement with the frame member 150 on return of the latter to initial position (see Figure 10).

As illustrated in Figures 1 and 2, the door 22 is provided with a discharge outlet passage 170 which, in the closed position of the door, is in alinement with the discharge chute of the bottle ejecting mechanism just described. This discharge passage 170 is provided with a pair of pivoted door or closure elements 172 mounted on spring hinges 174 adapted to maintain said elements normally in closed relation to said outlet passage 170, and the edges of the elements 172 carry rubber packing strips 176 which meet on closing of said elements to produce an effective sealing action. Moreover, the inlet end of said passage 170 is preferably provided with a margin of packing or insulating material 178 which serves also as a buffer or stop means for said door or closure elements 172. Also the outer or outlet edge of said passage 170 is fitted with an expansible collar 180 adapted for slidingly embracing the bottle in its outward discharge movement as represented in Figure 1, whereby a practically continuous seal is maintained throughout the entire period of the bottle discharge operation.

Preliminary to the operation of the apparatus, the bottle compartments of the magazine structure are of course filled with a supply of the bottles 44, these compartments being filled at the front of the machine and the magazine unit being rotated for the purpose by releasing the latch 122, which allows free wheeling of the gear connections to the magazine rack gear 40. The bottles 44 are simply inserted at the flaring entrance openings 52 for the bottle necks at the upper ends of the compartments and then lowered therein while the shoulders 48 maintain engagement with the ribs 50 of the bottles, and thus hold them from working outward. The bottom bottle in each compartment rests upon the supporting ribs 82 and 84, thus keeping the bottles of each stack in horizontal position, as illustrated in Figure 2. By reference to Figure 19 it will be noted that the lower end of one of each pair of shoulders 48 is cut away (as indicated at 48') to permit release of the lowermost bottle as the same moves downwardly and laterally under the action of the bottle feeding and dispensing mechanism.

After a supply of bottles has been placed in the magazine unit, said unit will be locked by the latch member 122, with one of the bottle compartments directly over the bottle feeding or discharge opening 86, which opening is permanently fixed over the inclined platform or ramp member 100, as already described. Each operation of the bottle feeding or dispensing means is designed to produce an angular movement (of substantially 45 degrees) of the radial plate segments 92, one of which will be initially located in starting position directly below said opening 86, and with its ribs 94 and 96 supporting the bottles of the compartment occupying that position, the bottles of the other compartments still remaining supported by the spaced ribs 82 and 84 on the upper face of the retainer plate 28.

Figure 16:
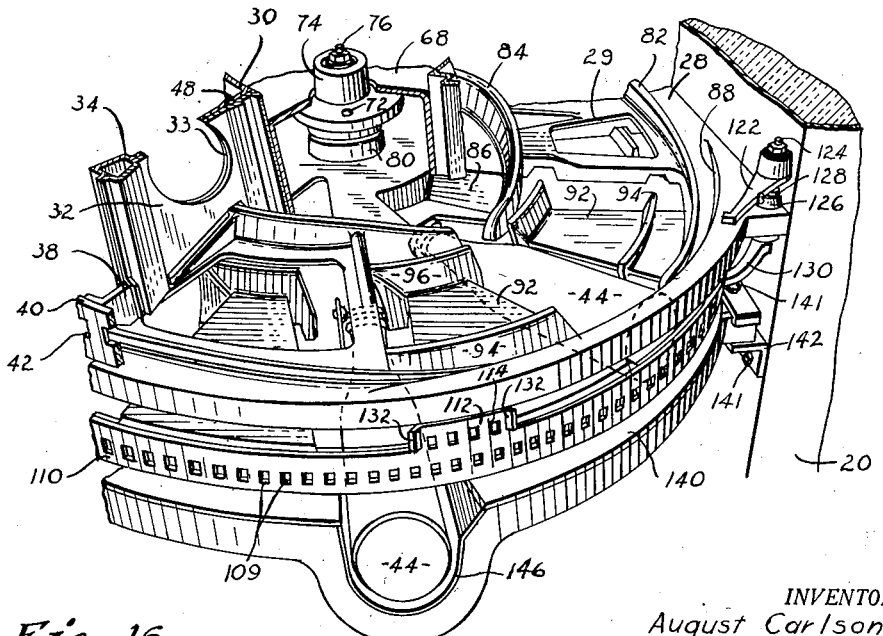
Figure 17:
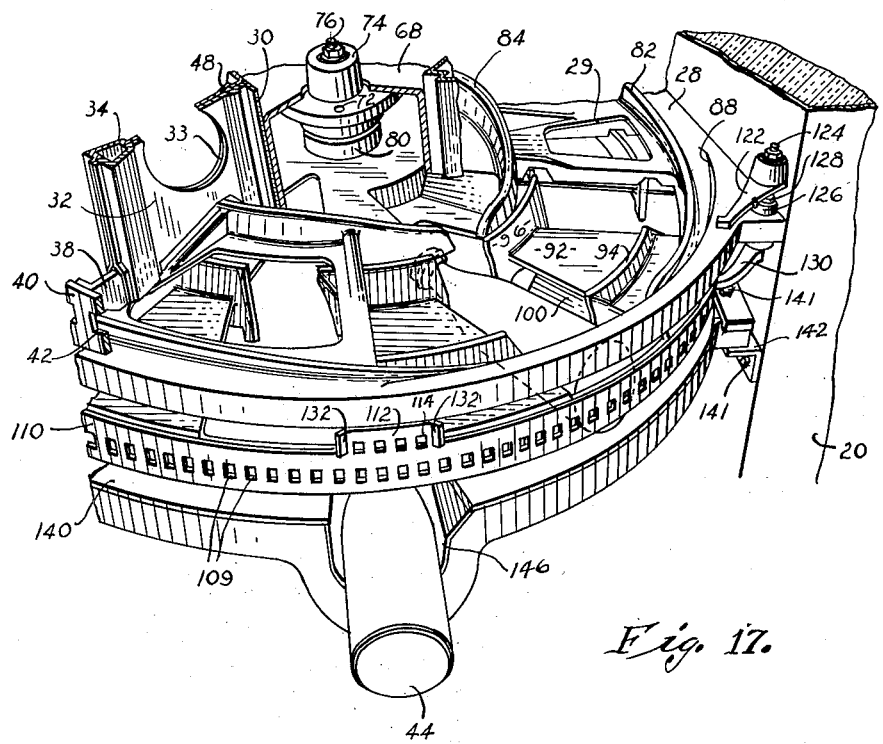
Figure 18:
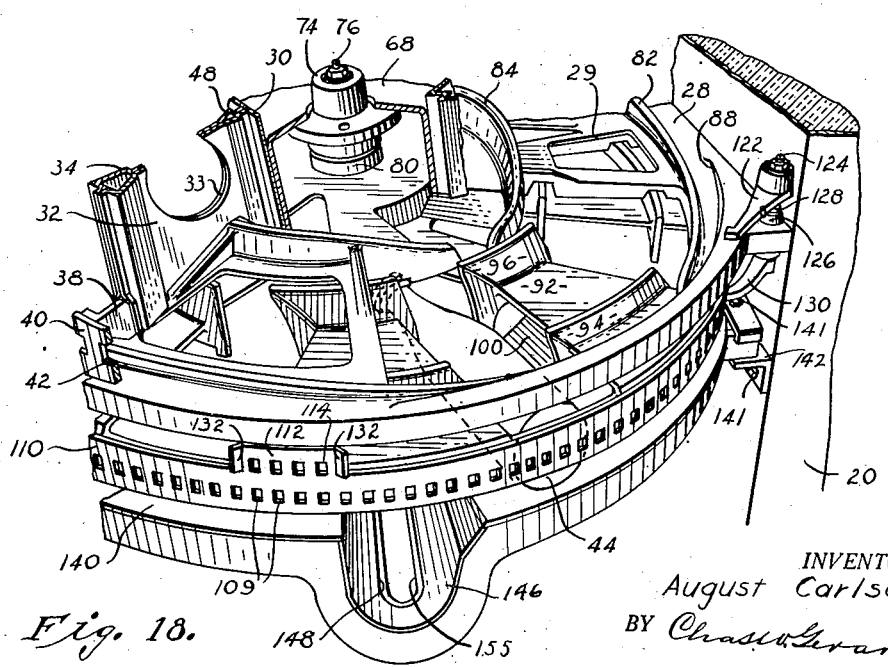

Referring now more particularly to Figures 15 et seq. of the drawings, Figures 15 and 19 represent a bottle as having just been received from one of the magazine compartments and resting upon the ribs 94 and 96 of one of the radial plate segments 92. As these segments (which comprise part of the bottle dispensing mechanism) are rotated by operation of the drive connections, any bottle already supported on the plate 148 or on the ramp 100 (in advance of the moving plate segments) will of course be carried on into the discharge chute, as indicated in Figure 16.

On arriving in discharge position (over the opening 86) it will be understood that the bottom or lowermost bottle has moved off the inclined ribs 82 and 84, which terminate slightly below the level of the upper edges of the ribs 94 and 96 of the segment 92, so that the bottle is skidded on to the latter without meeting any rough corners or projections, and at the same time is held against any radially outward movement by retaining engagement with the shoulders 48.

The continued movement of segment 92 releases the bottom bottle, at said opening 86, allowing it to be eased down, as it were, over the ends of the ribs 82 and 84 and into the gradually widening space which is being opened up between said ribs and the inclined edges of the ribs 94 and 96 of the withdrawing segment 92.

As soon as the upper rear corners of said ribs 94 and 96 pass from beneath the bottle (thus allowing it to settle downward), it becomes disengaged from the shoulders 48 at the cutout 48', and thereafter continues to ease downward, first due to the widening of the space between the ribs 94 and 96 and the fixed ribs 82 and 84, and thereafter (on reaching the ramp 100) by the easing of the bottle down said ramp while continuing to be supported by the rear inclined edges of said ribs 94 and 96 of the withdrawing segment 92 as illustrated in Figure 20 while travelling in the direction of the discharge chute; and the curved end edges of said ribs (as well as of the ribs 94 and 96) effectually prevent any backward or reverse movement of the bottle after moving downwardly into the positions indicated in Figures 20 and 21.

Meanwhile it will also be noted that the ends of the ribs 82 and 84 project far enough beneath the stack of bottles from which a bottle is being discharged to intercept and support the remainder of the stack until the next following segment 92 has moved up into supporting position, as illustrated in Figure 20.

Moreover it is pointed out that all this bottle dispensing action takes place without producing any upward thrust or movement of the bottles in the stack over the discharge opening 86, which is an important economical factor, in addition to the fact that no dropping or bumping action takes place in the course of the downward feeding movement of the bottles, and which movement is characterized throughout by an even, uniform and substantially noiseless travel of the bottles, all through the dispensing operation.

As soon as the parts have been shifted into the position illustrated in Figure 21, it will be evident that the remaining bottles in the stack will continue to be supported by the segment 92 which has just arrived in bottle-supporting position, and until said segment has moved on for effecting the next succeeding bottle releasing operation, which operation will simply be a repetition of the action which has just been described.

It will thus be seen that the principal different operative positions are illustrated in Figures 15 to 18 as well as in Figures 19 to 21 of the drawings, in addition to which a bottle is understood to be delivered into the bottle discharge chute as the parts change from the position shown in Figure 19 to that illustrated in Figure 20, or as the parts shift from the position represented in Figure 15 to that illustrated in Fig. 16.

An operation of the bottle ejecting mechanism takes place in unison with each operation of the bottle feeding or dispensing mechanism as above described, for which purpose the lugs 164 are located substantially 45 degrees apart, as represented in Figure 4. Hence, each consecutive operative cycle of the bottle dispensing means will be accompanied by a movement of one of said lugs 164 into position for engaging the pin 160 for operation of the above described ejecting mechanism, whereby the bottle in the discharge chute will be thrust outwardly, as illustrated in Figure 4. The discharge passage in the door being in alinement with said discharge chute, the bottle will therefore be thrust through the entrance opening to said passage and thereupon operate to swing open the door or closure elements 172, and continue on through the opening in the elastic collar member 180, stopping in approximately the position illustrated in Figure 1. The bottle is thus presented in partly projecting relation, ready to be conveniently grasped by the customer, and meanwhile the interior of the apparatus is kept almost continuously sealed against outside temperature conditions until the bottle is actually removed and the door or closure elements 172 allowed to return automatically into their normally closed position. The completion of the movement of the lug 164 also releases the pin 160 and thereby allows the spring 166 to return the operating parts of the bottle ejecting mechanism to initial or inoperative position.

Referring now to the latching means for the magazine structure and the means for intermittently shifting the latter by operation of the drive connections to the gear 120 which engages the ring gear or rack 40, it will be observed that the two gear segments 112 are located 180° apart, as is also true of the gear 120 and the latch operating and releasing means—see Figure 1; as a consequence, at the end of each half revolution of the bottle feeding or dispensing mechanism, or for every four operations of said mechanism, one of the segments 112 arrives in position for engaging and operating the gear 116, which will in turn rotate the gear 120 for turning the ring gear 40 attached to the magazine structure. This will produce a partial turning of the magazine unit, corresponding to the length of the gear segments 112, and sufficient to advance the next adjacent bottle compartment (the one adjoining the compartment from which bottles have been removed) into bottle dispensing position over the opening 86. As soon as this shifting operation of the magazine unit has taken place, the magazine unit is again latched automatically by means of the latch element 122 dropping into engagement with the next opening 42' of the ring gear 40. The bottle dispensing operation will then operate to discharge the next four bottles from the magazine compartment which has thus been positioned into feeding or dispensing position over said opening 86, after which the same magazine shifting operation will be repeated for substituting the next adjoining bottle compartment into bottle feeding position over the opening 86, and the next four bottles will be discharged from it by the succeeding four operations of the dispensing mechanism, and so on.

Thus a complete cycle of the bottle dispensing operation, as required for removing a bottle from one of the compartments (occupying a position adjacent the opening 86 in the fixed plate 28), and to finally eject such bottle, may be said to comprise four successive movements of the bottle as produced by four successive angular movements of the rotary dispensing member comprised of the plate segments 92, as a result of which the bottle is first dropped through said opening 86 on to the ramp member 100, then is rolled down said ramp to one side of the discharge chute passage, and next is rolled into said discharge chute passage, from which it is discharged by the next operation of the ejecting means, representing the final phase of the cycle. The normal operation of the machine will of course not be established until after three phases of the first cycle are completed, resulting in a bottle being brought into position for operation of the ejecting means, as represented in Figure 16.

By means of this novel bottle dispensing and magazine shifting operation, it will be apparent that the unloading of the magazine unit is carried out progressively around the supporting axis of the magazine, with the result of maintaining a more even balance or distribution of the load with reference to said axis, which makes for a freer and more efficient action of the operating mechanism. Moreover the gradual and progressive feeding and dispensing of the bottles from all the magazine compartments in such uniform manner also promotes a more effective circulating movement of the air throughout the interior of the cabinet, thereby resulting in a comparatively more efficient refrigerating action than would otherwise take place.

A further feature of considerable importance which characterizes the improved construction is that the intermittent shifting of the dispensing operation from one bottle compartment to another insures that said dispensing operation is confined to only the coldest bottles in the total supply stored in the magazine unit, it being obvious of course that at all times the coldest bottles are naturally the lowermost bottles in the several compartments.

While the foregoing exemplifies one satisfactory form of construction for the efficient embodiment of the proposed improvements, it is obvious that various changes or modifications therein may be made without departing from the essential features of the invention; I therefore desire to be understood as reserving the right to make such changes or variations as may fall within the spirit and scope of my invention as defined by the appended claims.

Having thus described the invention, what is claimed is:

1. Bottle vending apparatus comprising, a magazine structure having multiple compartments for separate stacks of bottles in horizontal position, bottle dispensing mechanism below said magazine structure in position to receive bottles from the several compartments, bottle ejecting mechanism for receiving the bottles from said dispensing mechanism, means for actuating said dispensing mechanism for transferring the bottles one by one to said ejecting mechanism, and means actuated by the operation of said dispensing means for intermittently shifting the magazine structure for presenting different bottle compartments in feeding relation to said dispensing mechanism.

2. Bottle vending apparatus comprising a magazine structure having multiple compartments for the bottles to be vended, bottle dispensing means in communicating relation to said magazine structure, means actuated by the operation of said dispensing means after a predetermined number of dispensing operations for shifting said magazine structure to locate a different bottle compartment in feeding relation to said dispensing means, and bottle ejecting means in receiving relation to said dispensing means.

3. In bottle vending apparatus, a rotatable magazine structure comprising multiple radially arranged bottle compartments for stacking the bottles to be vended in horizontal position, spaced shoulders at the inner ends of the compartments for retaining engagement with the bottles, the upper ends of the shoulders extending in diverging relation to permit horizontal inserting movement of the bottles at the upper ends of the compartments, and a bottom member in fixed position underlying said compartments and having a discharge opening and spaced annular ribs of different heights adapted to support said bottles in horizontal position.

4. Vending apparatus comprising a rotatable magazine structure having multiple radially arranged bottle compartments for stacking the bottles to be vended in horizontal position, a vertical shoulder structure at the inner ends of the compartments for retaining engagement with the bottles, a fixed bottom member in position for supporting the bottles in said compartments and having a bottle discharge opening, and bottle dispensing means operative to move the bottles laterally away from said discharge opening, said shoulder structure having clearance openings or recesses to release the bottles to said dispensing operation.

5. Vending apparatus comprising a magazine structure having multiple radially extending bottle compartments for stacks of the bottles to be vended, a fixed bottom member rotatably supporting said magazine structure and having a bottle discharge opening, a bottle dispensing member rotatably supported beneath said bottom member and operative to move the bottles away from said discharge opening, and means actuated by the operation of said dispensing member after a predetermined number of dispensing operations for imparting intermittent rotative movement to said magazine structure to locate another bottle compartment in feeding relation to said discharge opening.

6. Vending apparatus comprising a magazine structure having a plurality of radially extending bottle compartments for the bottles to be vended, a fixed bottom member for said magazine structure and having a bottle discharge opening and formed with spaced ribs of relatively different heights adapted to support the bottles in horizontal position, a rotary bottle dispensing member beneath said fixed member and having supporting means effective for maintaining the horizontal position of the bottles when over said discharge opening and preparatory to moving the same away from said opening into bottle ejecting position, and means for intermittently shifting said magazine structure to locate a different bottle compartment in bottle feeding position over said discharge opening.

7. In vending apparatus, a rotatable magazine structure having a plurality of bottle compartments for retaining the bottles to be vended in stacked relation, a bottom member in fixed position for supporting the bottles in said compartments and having a bottle discharge opening and bottle supporting elements of relatively different heights for supporting said bottles in horizontal position, and bottle dispensing mechanism operating beneath said bottom member and having supporting means for maintaining said horizontal position of the bottles when traversing said opening and including curved bottle engaging means operative to counteract any reverse movement of the bottles as the same are moved away from said opening into bottle ejecting position.

8. In vending apparatus, a rotatable magazine structure having a plurality of bottle compartments for receiving the bottles to be vended in stacked relation, a bottom member in fixed position for supporting the bottles in said compartments and having a discharge opening and also formed with spaced ribs adapted to support said bottles in horizontal position, and a rotary bottle dispensing member operating beneath said fixed bottom member and formed with vertically arranged rib structures operating both to initially support the bottles in horizontal position when at said opening and also having curved bottle engaging edges operative to counteract any reverse movement thereof as the bottles are being moved away from said opening into bottle ejecting position.

9. In vending apparatus, a rotatable magazine structure having a plurality of radially extending bottle compartments for retaining the bottles to be vended in stacked relation, a bottom member in fixed position for supporting the bottles in said compartments and having a discharge opening and also formed with spaced ribs adapted to support said bottles in horizontal position, and a rotary bottle dispensing member operating beneath said bottom member and formed with vertically arranged rib structures operating both to initially support the bottles in horizontal position, when at said opening, and also provided with bottle engaging surfaces operative to counteract any reverse movement of the bottles while being shifted into bottle ejecting position.

10. Vending apparatus comprising means providing a vertical bottle compartment having a bottom outlet or discharge opening, a rotary bottle feeding and dispensing member comprising a plurality of spaced radially extending segments operating as intermittent closures for said outlet opening, and means for imparting intermittent rotary movement to said dispensing member and thereby feeding a bottle to the space between adjoining segments thereof, said segments having projecting portions extending both above and below the segments and formed with supporting and guiding edges spaced for embracing opposite sides of the bottles at different points lengthwise thereof, the adjacent portions of the guiding edges of adjoining segments extending angularly downward for permitting downward movement of the bottles while counteracting any tendency to reverse movement of the same.

11. In vending apparatus, the combination of means providing a vertical bottle compartment having a bottom outlet opening, dispensing means comprising a plurality of radially extending segments operating as intermittent closures for said outlet opening, bottle ejecting means in receiving relation to said dispensing means, means for actuating said dispensing means across said opening and thereby feeding a bottle into the space between adjoining segments of said dispensing means, and guiding elements carried by the adjacent portions of adjoining segments and cooperating to form inclined guideways projecting below said segments and permitting gradual lowering of the bottles in their movement to the ejecting means while counteracting any tendency to reverse movement of the bottles.

12. Vending apparatus comprising a rotatable magazine structure providing a plurality of vertical bottle compartments, a fixed member providing a unitary bottom for all said bottle compartments and having an outlet opening, a bottle dispensing member below said fixed member and operative to receive bottles one by one from said outlet opening, bearings supported by said fixed member and serving to journal both said magazine structure and said dispensing member for rotary movement, said magazine structure being removably mounted in operative position with relation to said fixed member and its bearing thereon, and shifting means actuated intermittently by the operation of said dispensing member for periodically shifting said magazine structure to locate a different bottle compartment in discharge relation to said opening.

13. Bottle vending apparatus comprising a vertical bottle compartment having an outlet or discharge opening for the bottles, dispensing means having a plurality of spaced radial segments operating as intermittent closures for said discharge opening, bottle ejecting means in receiving relation to said dispensing means, a ramp element intermediate said discharge opening and said ejecting means, means for actuating said dispensing means for intermittently releasing a bottle from said opening on to said ramp element for movement to said ejecting means, and guiding projections carried by said radial segments and cooperating to control the movement of said bottle to the ejecting means.

14. Bottle ejecting apparatus comprising a rotatable magazine structure providing a plurality of radially arranged bottle compartments, a fixed member providing a unitary bottom for said magazine structure and a single discharge outlet opening for the bottles, rotary dispensing means having a plurality of spaced radial segments operating as intermittent closures for said outlet opening, bottle ejecting means in receiving relation to said dispensing means, a ramp device intermediate said outlet opening and said ejecting means, means for actuating said dispensing means for intermittently releasing a bottle from said opening on to said ramp device for movement to said ejecting means, guiding means carried by said radial segments for controlling the movement of said bottle to the ejecting means, and means actuated by operation of said dispensing means for intermittently shifting said magazine structure for locating a different bottle compartment in bottle feeding relation to said outlet opening.

15. Bottle vending apparatus comprising means providing a vertical bottle compartment having a bottom outlet opening, dispensing means comprising means operating as intermittent closure means for said outlet opening, bottle ejecting means in receiving relation to said dispensing means, means for actuating said dispensing means for intermittently releasing a bottle from said opening for movement to said ejecting means, and means actuated by the operation of said dispensing means for operating said bottle ejecting means.

AUGUST CARLSON.

REFERENCES CITED

The following references are of record in the file of this patent:

UNITED STATES PATENTS

| Number | Name | Date |
|---|---|---|
| 523,826 | Young | July 31, 1894 |
| 756,788 | Hendrickson | Apr. 5, 1904 |
| 1,151,532 | Philipssen | Aug. 24, 1915 |
| 1,160,557 | Wilton | Nov. 16, 1915 |
| 1,205,844 | Berry | Nov. 21, 1916 |
| 1,717,025 | Green | June 11, 1929 |
| 1,765,963 | Baxter | June 24, 1930 |
| 1,767,803 | Leatherman | June 24, 1930 |
| 1,925,953 | Cox | Sept. 5, 1933 |
| 2,104,034 | Hamel | Jan. 4, 1938 |
| 2,236,688 | Kuhl | Apr. 1, 1941 |
| 2,266,025 | Grau | Dec. 16, 1941 |
| 2,296,154 | Elliot | Sept. 15, 1942 |
| 2,315,515 | Gibson | Apr. 6, 1943 |
| 2,371,316 | Rice et al. | Mar. 13, 1945 |
| 2,374,168 | Bowman | Apr. 24, 1945 |
| 2,407,402 | Clem | Sept. 10, 1946 |